(12) United States Patent
    Michener et al.

(10) Patent No.:  US 12,643,362 B2
(45) Date of Patent:      Jun. 2, 2026

(54) SHOCK SERVICE ADVISORY ALGORITHM

(71) Applicant: Ford Global Technologies, LLC, Dearborn, MI (US)

(72) Inventors: Jason Wallace Michener, Novi, MI (US); Rick Dempsey, Milford, NH (US)

(73) Assignee: Ford Global Technologies, LLC, Dearborn, MI (US)

( * ) Notice: Subject to any disclaimer, the term of this patent is extended or adjusted under 35 U.S.C. 154(b) by 130 days.

(21) Appl. No.: 18/593,367

(22) Filed: Mar. 1, 2024

(65) Prior Publication Data

US 2025/0276555 A1     Sep. 4, 2025

(51) Int. Cl.
    *B60G 17/0185*        (2006.01)
    *G07C 5/08*           (2006.01)

(52) U.S. Cl.
    CPC ....... *B60G 17/0185* (2013.01); *G07C 5/0816* (2013.01); *B60G 2400/202* (2013.01); *B60G 2400/252* (2013.01); *B60G 2800/80* (2013.01)

(58) Field of Classification Search
    CPC .......... B60G 17/0185; B60G 2400/202; B60G 2400/252; B60G 2800/80; G07C 5/0816
    USPC ...................................................... 701/29.6
    See application file for complete search history.

(56) References Cited

U.S. PATENT DOCUMENTS

| | | | |
|---|---|---|---|
| 7,813,850 | B2 | 10/2010 | Mannerfelt |
| 10,850,768 | B2 | 12/2020 | Wijffels et al. |

| | | | | |
|---|---|---|---|---|
| 11,549,565 | B2 | 1/2023 | Ericksen et al. | |
| 11,813,912 | B1 * | 11/2023 | Ford ................ | B60G 17/01908 |
| 11,912,089 | B1 * | 2/2024 | Golden ............. | B60G 17/0195 |
| 2008/0059012 | A1 * | 3/2008 | Konopa ................. | B60G 13/16 |
| | | | | 701/22 |
| 2011/0127733 | A1 * | 6/2011 | Conradie ............... | B60G 17/08 |
| | | | | 280/5.514 |
| 2015/0081171 | A1 * | 3/2015 | Ericksen ............. | B60G 17/017 |
| | | | | 701/37 |

(Continued)

FOREIGN PATENT DOCUMENTS

| | | | | |
|---|---|---|---|---|
| CN | 118478973 | A * | 8/2024 | ............. B62K 25/04 |
| GB | 2255752 | A * | 11/1992 | ........... B60G 17/018 |

(Continued)

*Primary Examiner* — Atul Trivedi

(74) *Attorney, Agent, or Firm* — Burr & Forman; Lorne Forsythe

(57)                ABSTRACT

A method for determining an operation state of a suspension damper of a vehicle that may include receiving first data, determining whether the vehicle may be in a steady state condition based on the first data, and responsive to the vehicle being determined to be in the steady state condition, determining damping oscillation magnitude data for a set of suspension dampers based on second data. The method may further include performing a comparison between the damping oscillation magnitude data for a reference suspension damper and the damping oscillation data for remaining suspension dampers, determining an operation state of the reference suspension damper based on the comparison, cycling the reference suspension damper to one of the remaining suspension dampers, and repeating the method until the operation state of each one of a set of suspension dampers has been determined.

20 Claims, 6 Drawing Sheets

(56)　References Cited

U.S. PATENT DOCUMENTS

| | | | | |
|---|---|---|---|---|
| 2015/0112540 A1* | 4/2015 | Rutkowski | .............. | G07C 5/006 |
| | | | | 701/29.4 |
| 2015/0165858 A1* | 6/2015 | Suissa | ................. | B60G 17/0408 |
| | | | | 280/5.515 |
| 2015/0197133 A1* | 7/2015 | VanRaaphorst | .... | B60G 17/0161 |
| | | | | 280/6.159 |
| 2018/0339566 A1* | 11/2018 | Ericksen | .............. | B60G 17/016 |
| 2019/0080529 A1* | 3/2019 | Saylor | .................. | G07C 5/0816 |
| 2019/0102858 A1 | 4/2019 | Pivnick et al. | | |
| 2019/0102959 A1* | 4/2019 | Saylor | .................. | G07C 5/0825 |
| 2019/0353561 A1* | 11/2019 | Landolsi | ........... | B60G 17/0195 |
| 2021/0260950 A1 | 8/2021 | Eyerman et al. | | |
| 2022/0242189 A1* | 8/2022 | Irle | ...................... | B60G 17/019 |
| 2022/0305868 A1* | 9/2022 | Konada | .............. | B60G 17/0165 |
| 2022/0396113 A1* | 12/2022 | Kim | ................... | B60G 17/0165 |
| 2023/0012186 A1 | 1/2023 | Siegel et al. | | |
| 2023/0213081 A1* | 7/2023 | Michener | ............... | B60G 13/08 |
| | | | | 188/266.1 |
| 2023/0271594 A1* | 8/2023 | Chen | ..................... | B60W 10/18 |
| | | | | 701/70 |

FOREIGN PATENT DOCUMENTS

| | | | | | |
|---|---|---|---|---|---|
| JP | 5273901 | B2 | | 8/2013 | |
| JP | 2017071310 | A * | 4/2017 | .......... | B60G 17/019 |
| JP | 6359163 | B1 * | 7/2018 | ......... | B60G 17/0165 |
| KR | 970005582 | B1 * | 4/1997 | ......... | B60G 17/0165 |
| WO | WO-2020081977 | A1 * | 4/2020 | ............ | B60G 17/06 |
| WO | WO-2020150522 | A1 * | 7/2020 | ........... | B60G 17/018 |

\* cited by examiner

300

Process Start.
301

Determine
Vehicle
Parameters.
310

Repeat

Classify fault
state. 370

Report fault
state. 380

Yes

Is vehicle is at
steady state?
315

No

Is there a
fault state?
360

Yes

Final cycle
completed?
350

No

After final
cycle

Yes

Determine
damping
oscillation
magnitude data.
320

Compare reference
suspension damper to
remaining dampers. 330

Determine
operation state.
340

Cycle reference
suspension
damper. 355

SHOCK SERVICE ADVISORY ALGORITHM

TECHNICAL FIELD

Example embodiments generally relate to the operation of a vehicle's control system and, more particularly, relate to a control system for determining an operation state of suspension damper.

BACKGROUND

Modern vehicles have begun to utilize semi-active suspensions to continuously modify damping levels of a vehicle's suspension system to adjust to varying road conditions. Theses semi-active suspensions use suspension dampers to modify the damping level. However, detecting and classifying suspension damper faults is presently difficult. Due to the importance of damping adjustment, it would be useful to be able to detect and classify suspension damper faults quickly and early to ensure accurate suspension adjustment.

Thus, it may be desirable to be able to quickly and accurately define and classify suspension damper faults in order to notify a vehicle operator or service technician.

BRIEF SUMMARY OF SOME EXAMPLES

In accordance with an example embodiment, a control system for a suspension system of a vehicle may be provided. The control system may include a set of suspension dampers that may be operably coupled to a set of wheel assemblies of the vehicle, a first sensor suite that may measure first data that may include driver input data and vehicle system data, a second sensor suite that may measure second data that may include suspension assembly data, and a controller that may store the first data that may be received from the first sensor suite and the second data that may be received from the second sensor suite. The set of suspension dampers may include a reference suspension damper that may be operably coupled to a corresponding one of the set of wheel assemblies and remaining suspension dampers that may be operably coupled to remaining corresponding ones of the set of wheels. The controller may be configured to receive the first data, determine whether the vehicle may be in a steady state condition based on the first data, and responsive to the vehicle being determined to be in the steady state condition, determine damping oscillation magnitude data for the set of suspension dampers based on the second data. The controller may be further configured to perform a comparison between the damping oscillation magnitude data for the reference suspension damper and the damping oscillation data for the remaining suspension dampers, determine an operation state of the reference suspension damper based on the comparison, cycle the reference suspension damper to the one of the remaining suspension dampers; and repeat performing the comparison, determining the operation state of the reference suspension damper, and cycling of the reference suspension damper until the operation state of each one of the set of suspension dampers has been determined.

In another example embodiment, a method for determining an operation state of a suspension damper of a vehicle may be provided. The method may include receiving first data that may include driver input data and vehicle system data that may be measured from a first sensor suite, determining whether the vehicle may be in a steady state condition based on the first data, and responsive to the vehicle being determined to be in the steady state condition, determining damping oscillation magnitude data for a set of suspension dampers based on second data that may include suspension assembly data that may be measured from a second sensor suite. The method may further include performing a comparison between the damping oscillation magnitude data for a reference suspension damper and the damping oscillation data for remaining suspension dampers, determining an operation state of the reference suspension damper based on the comparison, cycling the reference suspension damper to one of the remaining suspension dampers, and repeating performing the comparison, determining the operation state of the reference suspension damper, and cycling of the reference suspension damper until the operation state of each one of a set of suspension dampers has been determined. The set of suspension dampers may be operably coupled to a set of wheel assemblies of the vehicle. The set of suspension dampers may include the reference suspension damper that may be operably coupled to a corresponding one of the set of wheel assemblies and the remaining suspension dampers that may be operably coupled to remaining corresponding ones of the set of wheels.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 illustrates a flow chart of an algorithm for detecting an operation state of a set of suspension dampers in accordance with an example embodiment;

DETAILED DESCRIPTION

Figure 1:
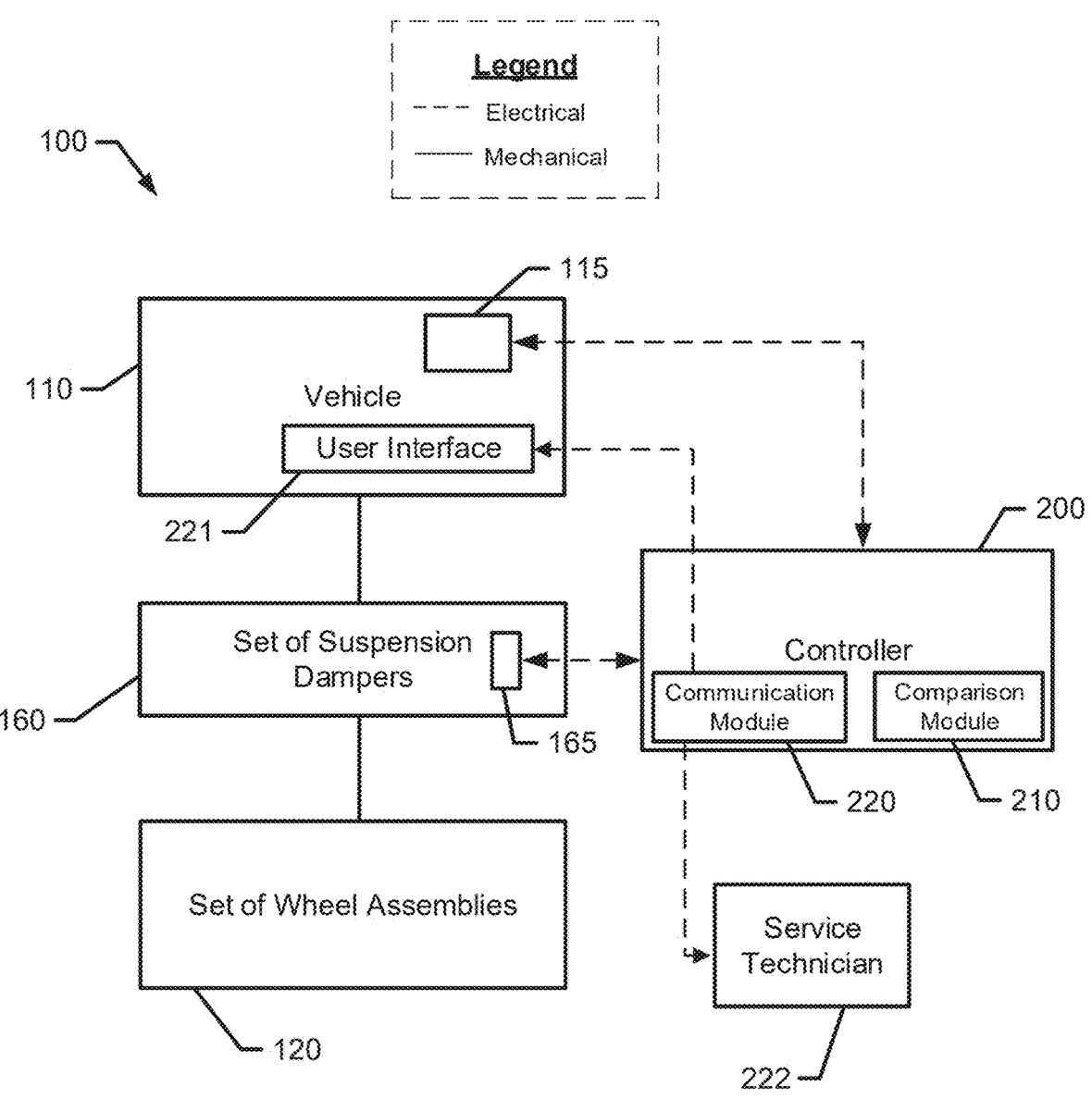
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a block diagram of a control system 100 according to an example embodiment. The components of the control system 100 may be incorporated into a vehicle 110 (e.g., may be operably coupled to a chassis of the vehicle 110, various components of the vehicle 110 and/or electronic control systems of the vehicle 110). In some cases, the chassis may include or be defined by a frame, and the frame may additionally be formed of one or more casted subframes. Of note, although the components of FIG. 1 may be operably coupled to the vehicle 110 and to each other, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include a set of wheel assemblies 120. For example, in an example embodiment, the set of wheel assemblies 120 may include a front left wheel assembly, a rear left wheel assembly, a front right wheel assembly, and a rear right wheel assembly. The set of wheel assemblies 120 may be operably coupled to a set of suspension dampers 160. In some cases, the set of wheel assemblies may include a reference suspension damper that may be operably coupled to a corresponding one of the set of wheel assemblies 120 and may include remaining suspension dampers that may be operably coupled to remaining corresponding ones of the set of wheel assemblies 120. In some cases, the set of wheel assemblies 120 may include various additional suspension system components which may include corresponding shocks, motion sensors for measuring rate of change of velocity, wheel bearings, brakes assemblies, and wheel hubs that are operably coupled to the corresponding ones of the set of wheel assemblies 120. In an example embodiment, the set of suspension dampers 160 may include any number of single instances of a suspension damper. In some cases, the set of wheel assemblies 120 may include any number of single instances of a wheel assembly. In an example embodiment, the set of wheel assemblies 120 and the set of suspension dampers may be part of a suspension assembly of the vehicle 110.

The vehicle 110 may include a first sensor suite 115. In an example embodiment, the first sensor suite 115 may include accelerometers, inertia sensors, driver input sensors, vehicle monitoring sensors, or any number of sensors that provide information on the operational state of the vehicle. In some cases, the inertia sensor may be an inertial measurement unit (IMU) using a plurality of signals from a plurality of sensors (accelerometers, position sensors, etc.) to create a vehicle dynamic model (VDM) to encapsulate the vehicle state. In an example embodiment, the driver input sensors may include throttle input sensors, brake input detectors, steering input detectors, or any number of input detectors for detecting the change in vehicle operator inputs. In some cases, the vehicle monitoring sensor may include tire pressure sensors, component sensors, or any number sensors that ensure components of the vehicle 110 are within the desired operation conditions. In an example embodiment, the first sensor suite 115 may be used for measuring first data. In some cases, first data may include driver input data, vehicle system data, or any other data that may be outputted from sensors within the first sensor suite 115.

In an example embodiment, the vehicle 110, the set of wheel assemblies 120, or the set of suspension dampers 160 may include a second sensor suite 165. The second sensor suite 165 may measure second data, which may be indicative of suspension assembly data such as suspension height data, rate of change of suspension position (suspension velocity), or rate of change of suspension velocity. Suspension assembly data may be any data that is representative of a state of the suspension assembly or a state of any suspension assembly component. In some cases, the second sensor suite 165 may include suspension height (or position) sensors, accelerometers, or any number of sensors that may detect suspension assembly data. In an example embodiment, the suspension height sensor may measure suspension height data, which may include suspension height, vehicle or wheel assembly ride height, wheel assembly position, or various other parameters of set of wheel assemblies 120. The various other parameters of the set of wheel assemblies 120 may be parameters such as velocity or rate of change of velocity that may be derived from position data, which may be measured by the suspension height sensor. The suspension height sensor may be a rotary suspension height sensor that may utilize a rotary arm to measure suspension height data. In some cases, the suspension height sensor may be a linear position sensor which may be operably coupled to a suspension damper. In an example embodiment, the linear position sensor may be a Hall sensor, which may utilize the Hall effect to determine suspension height data of the corresponding ones of the set of wheel assemblies 120. The linear position sensor may be an inductive sensor, hall sensor, or sensor/any other sensing technology used to determine suspension movement (either position or rate of change of velocity). In some cases, the suspension height sensor may be any type of sensor that may measure suspension height data of the corresponding ones of the set of wheel assemblies 120. In an example embodiment, the suspension height sensor may measure voltage measurements as the suspension height data and may correlate the voltage measurements to respective wheel positions along a vertical axis between full compression and full rebound of the wheel assemblies to determine the suspension height data.

Additionally, the control system 100 may further include a controller 200. While the controller 200 may have many functions, one such function of the controller 200 may be monitoring the status of other components of the vehicle 110. The components that the controller 200 may monitor the status of may be included in, or not included in, the control system 100. In this regard, the controller 200 may be responsible for detecting any faults associated with the components of the vehicle 110. In an example embodiment, the controller 200 may receive information that may be used to determine the status of various components or subassemblies of the vehicle 110 via various sensors that may be operably coupled to the components or subassemblies. Such sensors may be part of a sensor network and sensors of the sensor network may be operably coupled to the controller 200 (and/or the components or subassemblies). In some cases, the controller 200 may communicate the status of certain components in the vehicle 110 to other components in the vehicle 110, so that appropriate action may be taken to ensure the vehicle 110 may continue operating without any components that may be experiencing a fault.

In some cases, the controller 200 may include a comparison module 210 and a communication module 220. The comparison module 210 may be primarily responsible for determining if a fault may be occurring within the control system 100. The communication module 220 may be responsible for communicating information internally within the vehicle 110 or externally to other controllers or devices. The communication module 220 may communicate wirelessly, via a wired connection, or via any other communication protocol, method, or technique that may provide reliable communication between the controller 200 and the target device or destination. In an example embodiment, the communication module 220 may communicate with a user interface 221 of the vehicle 110 or with a user device of a service technician 222. In some cases, the controller 200 may store the first data and the second data. In an example embodiment, the controller 200 may include processing circuitry.

The processing circuitry may be configured to provide electronic control inputs to one or more functional units of the control system 100 and to process data received at or generated by the one or more functional units of the control system 100. Thus, the processing circuitry may be configured to perform data processing, control function execution and/or other processing and management services according to an example embodiment. In some embodiments, the processing circuitry may be embodied as a chip or chip set. In other words, the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include one or more instances of a processor and memory that may be in communication with or otherwise control other components or modules that interface with the processing circuitry. As such, the processing circuitry may be embodied as a circuit chip (e.g., an integrated circuit chip) configured (e.g., with hardware, software or a combination of hardware and software) to perform operations described herein. In some embodiments, the processing circuitry may be embodied as a portion of an onboard computer housed in the housing to control operation of the control system 100.

Figure 3:
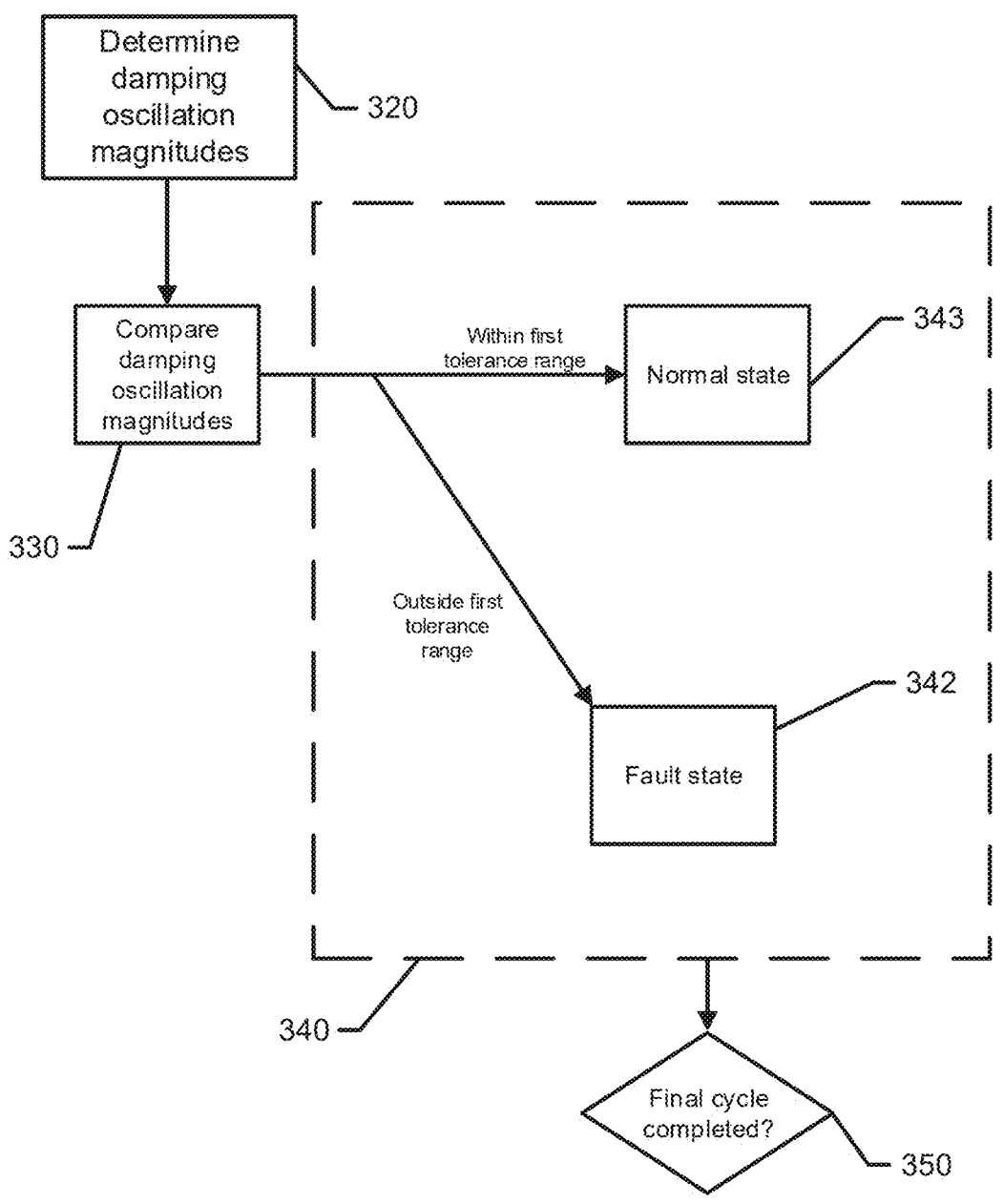
FIG. 3 illustrates a flow chart for determining if a fault state may be occurring in accordance with an example embodiment.
Figure 4:
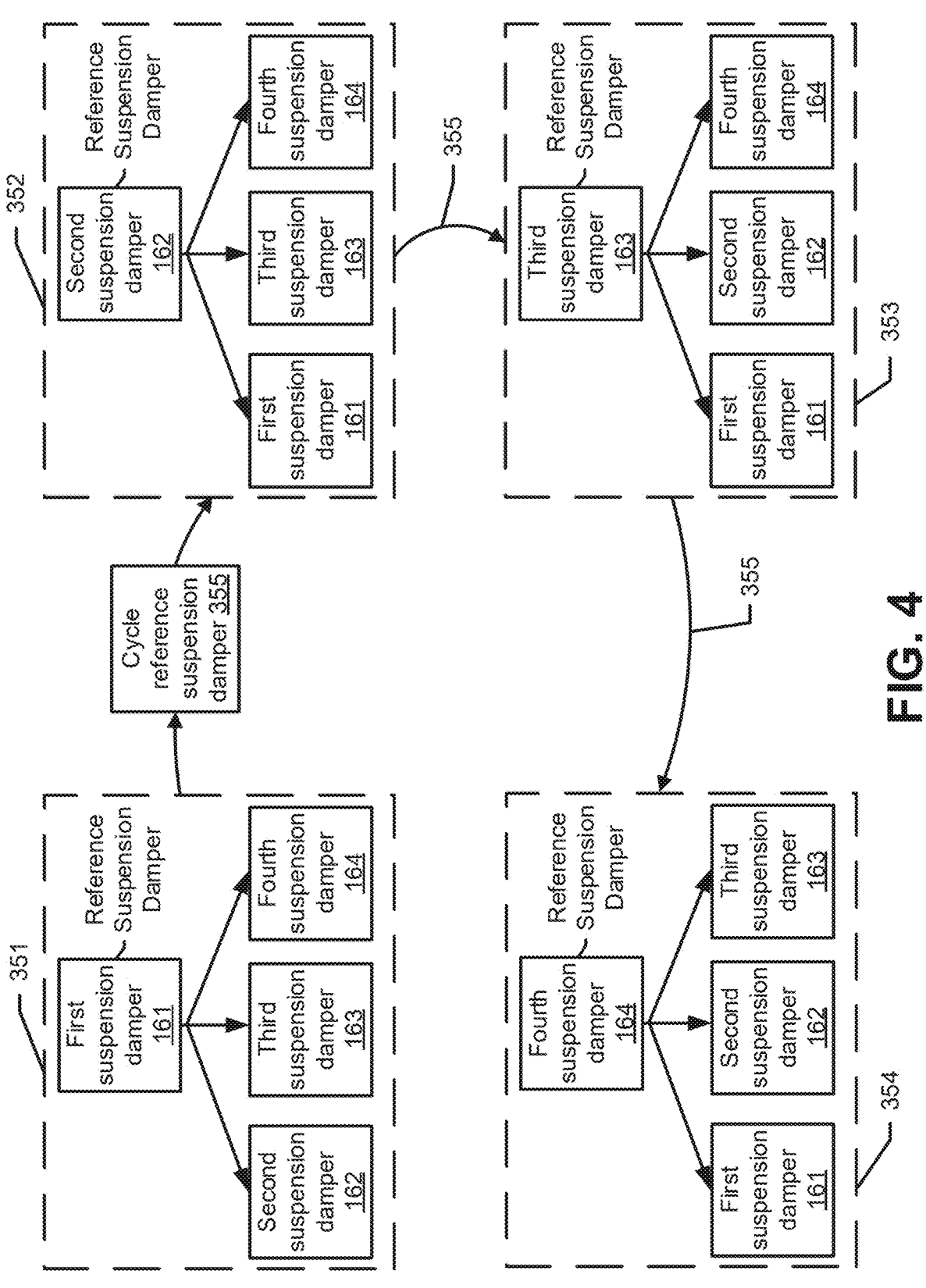
FIG. 4 illustrates a flow chart for cycling a reference suspension damper in accordance with an example embodiment.
Figure 5:
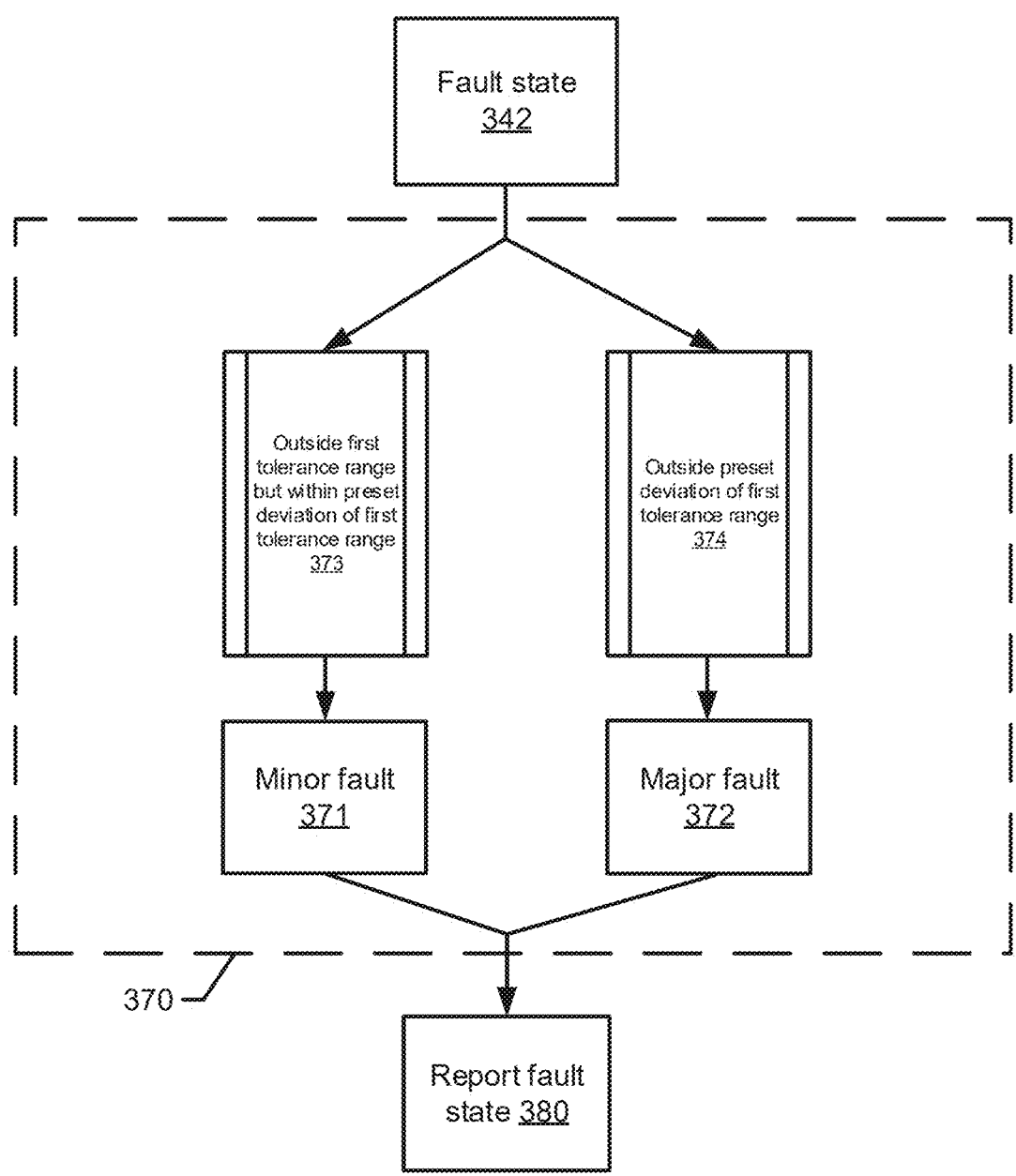
FIG. 5 illustrates a flow chart for classifying the fault state.

FIG. 2 illustrates a flow chart of an algorithm 300 for detecting an operation state of a set of suspension dampers 160. FIG. 3-FIG. 5 illustrate more detailed flow charts and examples for operations within the algorithm 300 in accordance with an example embodiment. The algorithm 300 may be run by the controller 200. The algorithm 300 initially may begin with configuration the first sensor suite 115, the second sensor suite 165, and any other sensors or systems within the control system 100, as well as may perform inventory of components and systems within the control systems in operation 301.

The algorithm 300 may determine vehicle parameters at operation 310. In some cases, the vehicle parameters may be parameters measured by the first sensor suite 115 and represented by the first data. In an example embodiment, the vehicle parameters may be one or more vehicle parameters determined by operation 310.

After the vehicle parameters are determined, the algorithm 300 may determine whether the vehicle is in a steady-state condition based on the vehicle parameter at operation 315. The steady-state condition may be defined as occurring when the vehicle parameters are detected as constant for a steady-state determination time period. In some cases, the vehicle 110 may not have a vehicle parameter be constant for an entire period of the steady-state determination time period, in which the steady-state condition is defined as occurring when the vehicle parameters are relatively constant (vehicle parameters values within a certain range or percentage of one another) for the steady-state determination time period. For instance, one of the vehicle parameters may be vehicle speed data. When vehicle speed data is within a 5 mile per hour range for a steady-state determination time period of 10 seconds, the vehicle 110 may be determined to be in the steady-state condition. If the vehicle 110 is not determined to be at the steady-state condition, the algorithm 300 may return to or continue to determine the vehicle parameter at operation 310.

If the vehicle 110 is determined to be at the steady-state condition, the algorithm 300 may proceed to measuring damping oscillation magnitude data at operation 320. The damping oscillation magnitude data may be damping oscillation magnitude data collected from each respective one of the set of suspension dampers 160 within a damping oscillation magnitude data collection time period. The damping oscillation magnitude data collection time period may overlap with the steady-state determination time period partially, fully, or not at all. In some cases, the damping oscillation magnitude data collection time period may be a brief time period directly after the steady-state determination time period. The damping oscillation magnitude data collection time period may only include a single value, a plurality of values, or an average of a plurality of values of current suspension height data.

In an example embodiment, damping oscillation magnitude data may be determined based on the second data measured by the second sensor suite. In some cases, damping oscillation magnitude data may be directly determined based on the suspension height data. In an example embodiment, damping oscillation magnitude data may be determined based on suspension stoke position. Suspension stroke position may be defined by where specifically the suspension assembly is disposed at a given time and the direction the suspension assembly may be headed at that time. Suspension stroke position may be determined via rate of change of suspension velocity data and suspension height data.

After collection of the damping oscillation magnitude data, the algorithm 300 may perform a comparison between a reference suspension damper and remaining suspension dampers in operation 330 and may determine an operation state of the reference suspension damper at operation 340 based on the comparison performed in operation 330. Later in the process, each one of the suspension dampers may take a turn being considered to be the reference suspension damper.

In an example embodiment, the comparison of the reference suspension damper to the remaining suspension dampers is comparing the damping oscillation magnitude data of the reference suspension damper to the damping oscillation magnitude data of the remaining suspension dampers. The reference suspension damper may be one of the set of suspension dampers 160 isolated for the remaining ones of the set of suspension dampers 160. The remaining ones of the set of suspension dampers 160 may then be the remaining suspension dampers. In some cases, the damping oscillation magnitude data of the remaining suspension dampers may be an average of the damping oscillation magnitude data of all of the remaining suspension dampers. In an example embodiment, the damping oscillation magnitude data of the remaining suspension dampers may be a median of the damping oscillation magnitude data of all of the remaining suspension dampers. The damping oscillation magnitude data of the reference suspension damper may also be an average, a median, or any other grouping or mathematical process performed of the damping oscillation magnitude data of the reference suspension damper.

In some cases, the damping oscillation magnitude data of the remaining suspension dampers may be represented by a first tolerance range based on the damping oscillation magnitude data of all of the remaining suspension dampers. In an example embodiment, the first tolerance range may be based on the average of the damping oscillation magnitude data of all of the remaining suspension dampers. In some cases, the first tolerance range may include a first tolerance range upper bound and a first tolerance range lower bound that are each separated from the average of the damping oscillation magnitude data of all of the remaining suspension dampers by a predetermined amount in opposing directions to define the first tolerance range. In an example embodiment, the first tolerance range upper bound may be a fixed percentage or fixed value above the average of the damping oscillation magnitude data of all of the remaining suspension dampers, and the first tolerance range lower bound may be a fixed percentage or fixed value below the average of the damping oscillation magnitude data of all of the remaining suspension dampers. For example, the first tolerance range upper bound may be 105% of the average of the damping oscillation magnitude data of all of the remaining suspension dampers and the first tolerance range lower bound may be 95% of the average of the damping oscillation magnitude data of all of the remaining suspension dampers. The first tolerance range may be related to the standard deviation of the damping oscillation magnitude data of the remaining suspension dampers. In some cases, the first tolerance range upper bound and the first tolerance range lower bound may be one standard deviation above and one standard deviation below, respectively, the average of the damping oscillation magnitude data of all of the remaining suspension dampers. In an example embodiment, the first tolerance range may be any range based on adjustments or functions applied damping oscillation magnitude data of all of the remaining suspension dampers that may determine an operation state of the reference suspension damper.

In some cases, the comparison may determine or classify the operation state as a selected one of a fault state 342 and a normal state 343, as shown in FIG. 3. In an example embodiment, the operation state may be determined to be a fault state 342 if the damping oscillation magnitude data of the reference suspension damper is outside of the first tolerance range. If the damping oscillation magnitude data of the reference suspension damper is within the first tolerance range, the operation state may be determined to be a normal state 343.

The algorithm 300 may then determine if a final cycle has been completed at operation 350. A final cycle may be determined to have been completed when every one of the set of suspension dampers 160 has had its operation state determined via being the reference suspension damper. In some cases, the algorithm 300 may cycle which of one the set of suspension dampers 160 is the reference suspension damper at operation 355. In this regard, the reference suspension damper and remaining suspension dampers may be only temporary classifications of the individual suspension dampers of the set of suspension dampers 160.

An example in accordance with an example embodiment may be seen in FIG. 4. In this instance, the set of suspension dampers 160 may include a first suspension damper 161, a second suspension damper 162, a third suspension damper 163, and a fourth suspension damper 164. Initially, the algorithm 300 may determine that the first suspension damper 161 is the reference suspension damper and thus, the algorithm 300 may determine the second suspension damper 162, the third suspension damper 163, and the fourth suspension damper 164 as the remaining suspension dampers. In this regards, the operation state of the first suspension damper 161 may be determined by a comparison of the damping oscillation magnitude data of the first suspension damper 161 to the first tolerance range based on the damping oscillation magnitude data of the remaining suspension dampers (or the second suspension damper 162, the third suspension damper 163, and the fourth suspension damper 164) in operations 330 and 340. The temporary classification of the first suspension damper 161 as the reference suspension damper may be determined to be the first cycle 351.

After the operation state of the reference suspension damper in the first cycle 351 has been determined, the algorithm 300 may determine that the final cycle has not been completed at operation 350 as the operation state of the second suspension damper 162, the third suspension damper 163, and the fourth suspension damper 164 has yet to be determined. Thus, the algorithm 300 may cycle the reference suspension damper at operation 355 to the second suspension damper 162. As such, the remaining suspension dampers may be the first suspension damper 161, the third suspension damper 163, and the fourth suspension damper 164. The temporary classification of the second suspension damper 162 as the reference suspension damper may be determined to be a second cycle 352. The operation state of the second suspension damper 162 may be determined by a comparison of the damping oscillation magnitude data of the second suspension damper 162 to the first tolerance range based on the damping oscillation magnitude data of the remaining suspension dampers (or the first suspension damper 161, the third suspension damper 163, and the fourth suspension damper) in operations 330 and 340.

The algorithm 300 may repeat operations 330, 340, 350, and 355 until the operation state of every one of the set of suspension dampers 160 has been determined. In this regard, the operation state of the third suspension damper 163 may be determined in a third cycle 353, and the operation state of the fourth suspension damper 164 may be determined in a fourth cycle 354.

In an example embodiment, after the algorithm 300 may determine that the final cycle is completed in operation 350, the algorithm 300 may check if the operation state of any one of the set of suspension dampers 160 is determined to be a fault state 342 in operation 360. If none of the operation states of the set of suspension dampers 160 is determined to be a fault state 342, the algorithm 300 may return to operation 310 and may determine or may continue to determine vehicle parameters. If the operation state of any one of the set of suspension dampers 160 is determined to be a fault state 342, every instance of the fault state 342 may be classified in operation 370.

In some cases, the fault state 342 of a suspension damper may be classified by the algorithm 300 according to the flow chart shown in FIG. 5. In this regard, the comparison of the reference suspension damper to the remaining suspension dampers performed in operation 330 may be revisited. The damping oscillation magnitude data of the reference suspension damper may not only be compared to the first tolerance range, but additionally to a preset deviation of the first tolerance range. In an example embodiment, the preset deviation may be a predetermined value or a variable value that may be applied to the first tolerance range upper bound and the first tolerance range lower bound. In some cases, the present deviation may be a fixed percentage, fixed value, or related to the standard deviation of the damping oscillation magnitude data of the remaining suspension dampers. In an example embodiment, the preset deviation may be a predetermined value set by the vehicle manufacturer, selected prior to any operation of the vehicle 110, based on the vehicle classification and/or vehicle model.

In some cases, the fault state 342 may be classified as a selected one of a minor fault 371 or a major fault 372. In an example embodiment, if the damping oscillation magnitude data of the reference suspension damper is outside first tolerance range but within the preset deviation of first tolerance range (as seen in operation 373), the fault state may be classified as the minor fault 371. In some cases, if the damping oscillation magnitude data of the reference suspension damper is outside the preset deviation of first tolerance range (as seen in operation 374), the fault state may be classified as the major fault 372.

In an example embodiment, algorithm 300 may report the fault state 342 in operation 380 upon determining and classifying the fault state 342 in operation 370. Depending on the classification of the fault state 342, the algorithm 300 may report the fault state 342 to different sources. In some cases, if the fault state 342 may be determined as a minor fault 371, a report may be delivered to an operator of the vehicle 110 via a display or user interface 221 of the vehicle 110. In an example embodiment, the report may be an auditory, visual, or haptic indication that may be transmitted by the communication module 220 of the controller 200 to a smart phone or other user device of the operator of the vehicle 110. In some cases, the report may be transmitted by the communication module 220 to a communication or user device associated with a service technician 222. In an example embodiment, the report may only be sent to the operator if the fault state 342 may be classified as the minor fault 371. In some cases, the report may be sent to both the operator and the service technician 222 if the fault state 342 may be classified as the major fault 372. In an example embodiment, even if the fault state 342 may be determined as occurring, a report may be sent to both, one, or neither of the operator and service technician 222. In some cases, the report sent to the service technician 222 may include vehicle specification and suspension damper specific details so that a replacement for the suspension damper or a specific component of the suspension damper may be pre-ordered. For example, the suspension damper specific details may be a suspension damper model or a suspension damper location.

In an example embodiment, the algorithm 300 may determine the operation state utilizing only onboard vehicle resources. For example, the operation state may be determined without the use of an external database or external processing. In some cases, an external database of previous suspension height data may be used by the controller 200. In an example embodiment, the controller 200 may upload current suspension height data to an external controller. In an example embodiment, machine learning or iterative learning may be used by the controller 200 to optimize the algorithm 300. In some cases, the first threshold range may be determined via machine learning.

In an example embodiment, the first tolerance range may only be one of a plurality of ranges. Each range of the plurality of ranges may be determined based on different periods of the damping oscillation magnitude data time period. For example, the plurality of ranges may include a daily range, a weekly range, a monthly range, and a lifetime range. The plurality of ranges may be based on any number of the damping oscillation magnitude data time periods. In some cases, the algorithm 300 may utilize the plurality of ranges to perform trend analysis on the set of suspension dampers 160. Trend analysis may be performed by comparing the damping oscillation magnitude data of the reference suspension damper to the plurality of ranges, as well as comparing the plurality of ranges to one another. In an example embodiment, the operation state may be determined via trend analysis.

In some cases, the algorithm 300 may include a plurality of preset deviations. The plurality of preset deviations may be set by the vehicle's manufacture to define specific mechanical and electrical functioning limits of the vehicle 110. The plurality of preset deviations may be used in trend analysis similar to the plurality of ranges.

In some cases, trend analysis may be performed using the plurality of ranges and the plurality of preset deviations together. In an example embodiment, the algorithm 300 may be run continuously and automatically by the controller 200. In some cases, the any and all operations of the algorithm 300 may be run simultaneously and in real time. For example, operations 320, 330, 340, 350, 355, 360, and 370 may be run together to determine and classify the operation state of every one of the set of suspension dampers 160 at the same time. In this regards, the first cycle 351, the second cycle 352, the third cycle 353, and the fourth cycle 354 may be run simultaneously in accordance with an example embodiment.

In an example embodiment, the result of the algorithm 300, in the case of a fault state 342, may be used compensate for suspension damper performance if the set of suspension dampers 160 are active suspension dampers by increasing the damping force of the individual suspension dampers to bring their performance in line with tolerances or performance of other suspension dampers on the vehicle. In some cases, this increase may be a temporary or may be more permanent solution depending on the severity of the fault state 342. In an example embodiment, the increase may be useful for extending individual suspension damper life or providing a 'limp home' solution if the fault state 342 is classified as a major fault 372.

Figure 6:
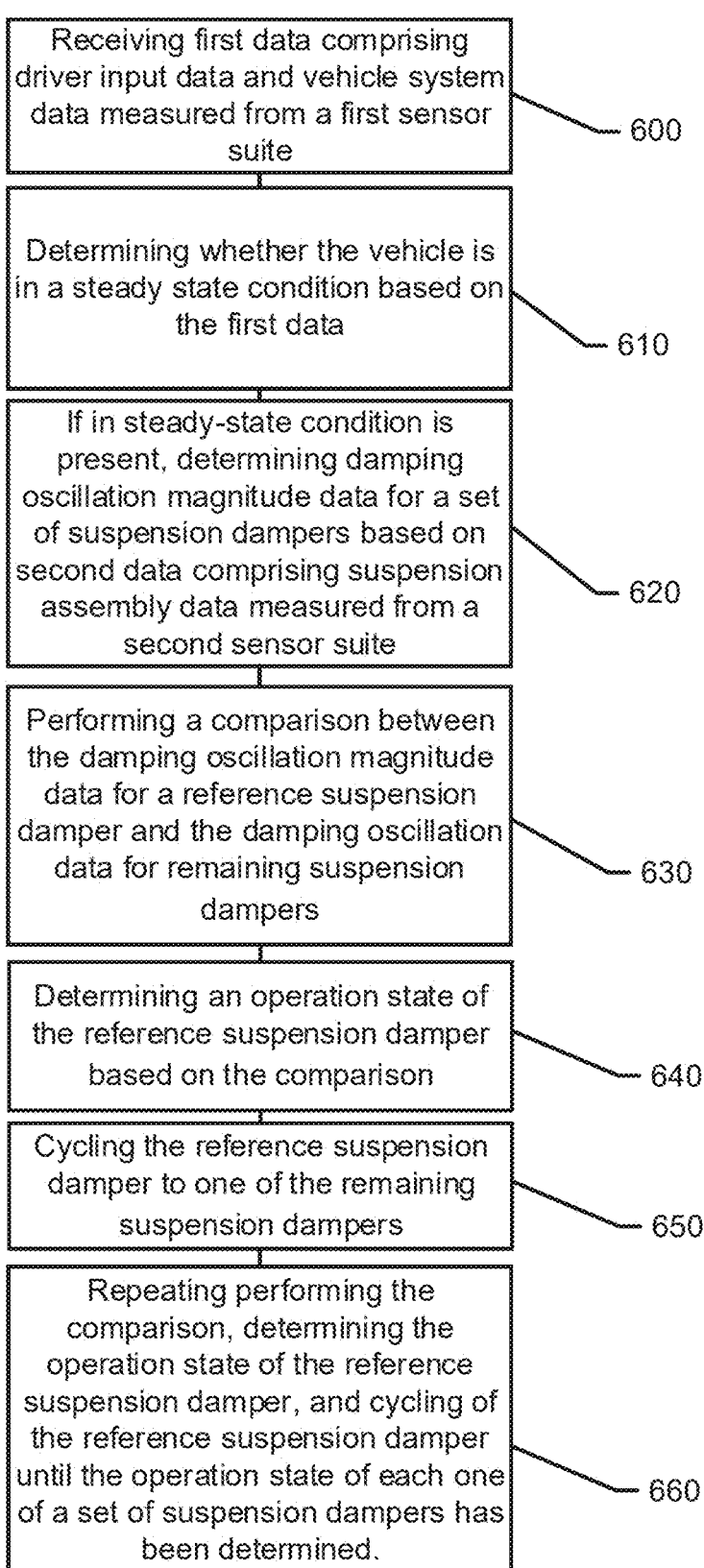
FIG. 6 illustrates a block diagram of a method in accordance with an example embodiment.

FIG. 6 illustrates a block diagram of a method for determining an operation state of a set of suspension dampers in accordance with an example embodiment. The method may include receiving first data comprising driver input data and vehicle system data measured from a first sensor suite in operation 600. The method may further include determining whether the vehicle is in a steady state condition based on the first data in operation 610. The method also may include, responsive to if in steady-state condition may be present, determining damping oscillation magnitude data for a set of suspension dampers based on second data comprising suspension assembly data measured from a second sensor suite in operation 620. The method may include performing a comparison between the damping oscillation magnitude data for a reference suspension damper and the damping oscillation data for remaining suspension dampers in operation 630. The method may continue to include determining an operation state of the reference suspension damper based on the comparison in operation 640. The method may persist to include cycling the reference suspension damper to one of the remaining suspension dampers in operation 650. Finally, the method may include repeating performing the comparison, determining the operation state of the reference suspension damper, and cycling of the reference suspension damper until the operation state of each one of a set of suspension dampers has been determined. at operation 660.

A control system for a suspension system of a vehicle may be provided. The control system may include a set of suspension dampers that may be operably coupled to a set of wheel assemblies of the vehicle, a first sensor suite that may measure first data that may include driver input data and vehicle system data, a second sensor suite that may measure second data that may include suspension assembly data, and a controller that may store the first data that may be received from the first sensor suite and the second data that may be received from the second sensor suite. The set of suspension dampers may include a reference suspension damper that may be operably coupled to a corresponding one of the set of wheel assemblies and remaining suspension dampers that may be operably coupled to remaining corresponding ones of the set of wheels. The controller may be configured to receive the first data, determine whether the vehicle may be in a steady state condition based on the first data, and responsive to the vehicle being determined to be in the steady state condition, determine damping oscillation magnitude data for the set of suspension dampers based on the second data. The controller may be further configured to perform a comparison between the damping oscillation magnitude data for the reference suspension damper and the damping oscillation data for the remaining suspension dampers, determine an operation state of the reference suspension damper based on the comparison, cycle the reference suspension damper to the one of the remaining suspension dampers; and repeat performing the comparison, determining the operation state of the reference suspension damper, and cycling of the reference suspension damper until the operation state of each one of the set of suspension dampers has been determined.

The control system for a suspension system of a vehicle of some embodiments may include additional features, modifications, augmentations and/or the like to achieve further objectives or enhance performance of the suspension assembly. The additional features, modifications, augmentations and/or the like may be added in any combination with each other. Below is a list of various additional features, modifications, and augmentations that can each be added individually or in any combination with each other. For example, the comparison may classify the operation state as a selected one of a normal state and a fault state. In an example embodiment, responsive to the damping oscillation magnitude data of the reference suspension damper being within a first tolerance range of the damping oscillation magnitude data of the remaining suspension dampers, the operation state may be determined to be a normal state. In some cases, the first tolerance range may be based on an average of the damping oscillation magnitude data of the remaining suspension dampers. In an example embodiment, responsive to the damping oscillation magnitude data of the reference suspension damper being outside the first tolerance range of the damping oscillation magnitude data of the remaining suspension dampers, the operation data may be determined to be fault state. In some cases, responsive to the operation data being determined to be fault state, the controller may be configured to classify the fault state as a minor fault or a major fault based on the comparison. In an example embodiment, responsive to the damping oscillation magnitude data of the reference suspension damper being outside the first tolerance range of the damping oscillation magnitude data of the remaining suspension dampers but within a preset deviation from the first tolerance range, the fault state may be classified as the minor fault. In some cases, responsive to the damping oscillation magnitude data of the reference suspension damper being outside the preset deviation from the first tolerance range, the fault state may be classified as the major fault. In an example embodiment, the preset deviation may be based on vehicle classification or vehicle model prior to any operation of the vehicle. In some cases, responsive to determining the operation state is the fault state, the controller is configured to report details of the fault state to an operator of the vehicle via a user interface or to a service technician based on how the fault state is classified. In an example embodiment, wherein responsive to fault state being classified as the major fault, the controller may be configured to report to a service technician the details of the fault state and suspension damper specific details, and the suspension damper specific details may include suspension damper model and suspension damper location. In some cases, the suspension assembly data may be a voltage measurement from a suspension height sensor. In an example embodiment, the driver input data may include throttle inputs, brake inputs, and steering inputs, and the vehicle system data may include inertia sensor data and tire pressure.

A method for determining an operation state of a suspension damper of a vehicle may therefore be provided. The method may include receiving first data that may include driver input data and vehicle system data that may be measured from a first sensor suite, determining whether the vehicle may be in a steady state condition based on the first data, and responsive to the vehicle being determined to be in the steady state condition, determining damping oscillation magnitude data for a set of suspension dampers based on second data that may include suspension assembly data that may be measured from a second sensor suite. The method may further include performing a comparison between the damping oscillation magnitude data for a reference suspension damper and the damping oscillation data for remaining suspension dampers, determining an operation state of the reference suspension damper based on the comparison, cycling the reference suspension damper to one of the remaining suspension dampers, and repeating performing the comparison, determining the operation state of the reference suspension damper, and cycling of the reference suspension damper until the operation state of each one of a set of suspension dampers has been determined. The set of suspension dampers may be operably coupled to a set of wheel assemblies of the vehicle. The set of suspension dampers may include the reference suspension damper that may be operably coupled to a corresponding one of the set of wheel assemblies and the remaining suspension dampers that may be operably coupled to remaining corresponding ones of the set of wheels.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A control system for a suspension system of a vehicle, the control system comprising:

a set of suspension dampers operably coupled to a set of wheel assemblies of the vehicle;

a first sensor suite for measuring first data comprising driver input data and vehicle system data;

a second sensor suite for measuring second data comprising suspension assembly data;

a controller storing the first data received from the first sensor suite and the second data received from the second sensor suite, wherein the set of suspension dampers comprises a reference suspension damper operably coupled to a corresponding one of the set of wheel assemblies and remaining suspension dampers operably coupled to remaining corresponding ones of the set of wheel assemblies;

wherein the controller is configured to:

receive the first data;

determine whether the vehicle is in a steady state condition based on the first data;

responsive to the vehicle being determined to be in the steady state condition, determine damping oscillation magnitude data for the set of suspension dampers based on the second data, perform a comparison between the damping oscillation magnitude data for the reference suspension damper and the damping oscillation data for the remaining suspension dampers during the steady state condition, determine an operation state of the reference suspension damper based on the comparison, cycle the reference suspension damper to the one of the remaining suspension dampers;

repeat performing the comparison, determining the operation state of the reference suspension damper, and cycling of the reference suspension damper until the operation state of each one of the set of suspension dampers has been determined during the steady state condition.

2. The control system of claim 1, wherein the comparison classifies the operation state as a selected one of a normal state and a fault state.

3. The control system of claim 2, wherein responsive to the damping oscillation magnitude data of the reference suspension damper being within a first tolerance range of the damping oscillation magnitude data of the remaining suspension dampers, the operation state is determined to be a normal state.

4. The control system of claim 3, wherein the first tolerance range is based on an average of the damping oscillation magnitude data of the remaining suspension dampers.

5. The control system of claim 3, wherein responsive to the damping oscillation magnitude data of the reference suspension damper being outside the first tolerance range of the damping oscillation magnitude data of the remaining suspension dampers, the operation state is determined to be fault state.

6. The control system of claim 5, wherein responsive to the operation state being determined to be fault state, the controller is configured to classify the fault state as a minor fault or a major fault based on the comparison.

7. The control system of claim 6, wherein responsive to the damping oscillation magnitude data of the reference suspension damper being outside the first tolerance range of the damping oscillation magnitude data of the remaining suspension dampers but within a preset deviation from the first tolerance range, the fault state is classified as the minor fault.

8. The control system of claim 7, wherein responsive to the damping oscillation magnitude data of the reference suspension damper being outside the preset deviation from the first tolerance range, the fault state is classified as the major fault.

9. The control system of claim 7, wherein the preset deviation is based on vehicle classification or vehicle model prior to any operation of the vehicle.

10. The control system of claim 6, wherein responsive to determining the operation state is the fault state, the controller is configured to report details of the fault state to an operator of the vehicle via a user interface or to a service technician based on how the fault state is classified.

11. The control system of claim 10, wherein responsive to fault state being classified as the major fault, the controller is configured to report to a service technician the details of the fault state and suspension damper specific details, wherein the suspension damper specific details comprise suspension damper model and suspension damper location.

12. The control system of claim 1, wherein the suspension assembly data is a voltage measurement from a suspension height sensor.

13. The control system of claim 1, wherein the driver input data further comprises throttle inputs, brake inputs, and steering inputs, and wherein the vehicle system data further comprises inertia sensor data and tire pressure.

14. A method for determining an operation state in a suspension damper of a vehicle, the method comprising:

receiving first data comprising driver input data and vehicle system data measured from a first sensor suite;

determining whether the vehicle is in a steady state condition based on the first data;

responsive to the vehicle being determined to be in the steady state condition, determining damping oscillation magnitude data for a set of suspension dampers based on second data comprising suspension assembly data measured from a second sensor suite, performing a comparison between the damping oscillation magnitude data for a reference suspension damper and the damping oscillation data for remaining suspension dampers during the steady state condition, determining an operation state of the reference suspension damper based on the comparison, cycling the reference suspension damper to one of the remaining suspension dampers;

repeating performing the comparison, determining the operation state of the reference suspension damper, and cycling of the reference suspension damper until the operation state of each one of a set of suspension dampers has been determined during the steady state condition, wherein the set of suspension dampers is operably coupled to a set of wheel assemblies of the vehicle, and wherein the set of suspension dampers comprises the reference suspension damper operably coupled to a corresponding one of the set of wheel assemblies and the remaining suspension dampers operably coupled to remaining corresponding ones of the set of wheel assemblies.

15. The method of claim 14, wherein the comparison classifies the operation state as a selected one of a normal state and a fault state.

16. The method of claim 15, wherein responsive to the damping oscillation magnitude data of the reference suspension damper being within a first tolerance range of the damping oscillation magnitude data of the remaining suspension dampers, the operation state is determined to be a normal state.

17. The method of claim 16, wherein responsive to the damping oscillation magnitude data of the reference suspension damper being outside the first tolerance range of the damping oscillation magnitude data of the remaining suspension dampers, the operation state is determined to be fault state.

18. The method of claim 17, wherein responsive to the operation state being determined to be fault state, the fault state is classified as a minor fault or a major fault based on the comparison.

19. The method of claim 18, wherein responsive to the damping oscillation magnitude data of the reference suspension damper being outside the first tolerance range of the damping oscillation magnitude data of the remaining suspension dampers but within a preset deviation from the first tolerance range, the fault state is classified as the minor fault.

20. The method of claim 19, wherein responsive to the damping oscillation magnitude data of the reference suspension damper being outside the preset deviation from the first tolerance range, the fault state is classified as the major fault.

\*　\*　\*　\*　\*